(12) United States Patent
Himoto et al.

(10) Patent No.: US 12,026,970 B2
(45) Date of Patent: Jul. 2, 2024

(54) DETECTION DEVICE

(71) Applicant: Japan Display Inc., Tokyo (JP)

(72) Inventors: Kento Himoto, Tokyo (JP); Takashi Nakamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/888,975

(22) Filed: Aug. 16, 2022

(65) Prior Publication Data

US 2023/0055390 A1 Feb. 23, 2023

(30) Foreign Application Priority Data

Aug. 23, 2021 (JP) ................................. 2021-135626

(51) Int. Cl.
  *G06V 40/13* (2022.01)
  *G06F 3/042* (2006.01)
(52) U.S. Cl.
  CPC ........ *G06V 40/1318* (2022.01); *G06F 3/0421* (2013.01)
(58) Field of Classification Search
  CPC ........................... G06V 40/1318; G06F 3/0421
  See application file for complete search history.

(56) References Cited

U.S. PATENT DOCUMENTS

| 2009/0027358 | A1 | 1/2009 | Hosono | |
| 2016/0155782 | A1* | 6/2016 | Sato | H10K 59/122 |
| | | | | 257/82 |
| 2021/0012082 | A1* | 1/2021 | Uchida | G06T 1/00 |
| 2023/0008416 | A1* | 1/2023 | Knausz | G06V 40/1318 |

FOREIGN PATENT DOCUMENTS

| JP | 2009-032005 A | 2/2009 |
| JP | 2019-174963 | * 8/2021 |

* cited by examiner

*Primary Examiner* — Patrick N Edouard
*Assistant Examiner* — Joseph P Fox
(74) *Attorney, Agent, or Firm* — K&L Gates LLP

(57) ABSTRACT

A detection device includes a substrate, a plurality of photodiodes that are provided on the substrate, and include organic semiconductors, a plurality of transistors that are provided correspondingly to the respective photodiodes, and each include a semiconductor layer, a gate electrode, and a source electrode, a plurality of lower electrodes that are provided between the transistors and the photodiodes in a direction orthogonal to the substrate, and are provided correspondingly to the respective photodiodes, an upper electrode provided across the photodiodes, a first auxiliary capacitor electrode provided between the substrate and each of the photodiodes in the direction orthogonal to the substrate, and a second auxiliary capacitor electrode that is provided in the same layer as that of the semiconductor layer or the source electrode, and faces the first auxiliary capacitor electrode with an insulating film interposed between the first auxiliary capacitor electrode and the second auxiliary capacitor electrode.

20 Claims, 11 Drawing Sheets

DETECTION DEVICE

CROSS-REFERENCE TO RELATED APPLICATION

This application claims the benefit of priority from Japanese Patent Application No. 2021-135626 filed on Aug. 23, 2021, the entire contents of which are incorporated herein by reference.

BACKGROUND

1. Technical Field

The present disclosure relates to a detection device.

2. Description of the Related Art

Optical sensors capable of detecting fingerprint patterns and vein patterns are known (for example, Japanese Patent Application Laid-open Publication No. 2009-032005). Such optical sensors each include a plurality of photodiodes each including an organic semiconductor material used as an active layer. An electric charge generated when each of the photodiodes is irradiated with light is stored in a sensor capacity generated between the anode and the cathode of the photodiode.

Increasing the area of a lower electrode of the photodiode can increase the sensor capacity, but may increase the leakage current of the photodiode. Reducing the area of the lower electrode of the photodiode may reduce the sensor capacity to lower the maximum output power of a signal output from the photodiode.

It is an object of the present disclosure to provide a detection device capable of improving the detection sensitivity.

SUMMARY

A detection device according to an embodiment of the present disclosure includes a substrate, a plurality of photodiodes that are provided on the substrate, and include organic semiconductors, a plurality of transistors that are provided correspondingly to the respective photodiodes, and each include a semiconductor layer, a gate electrode, and a source electrode, a plurality of lower electrodes that are provided between the transistors and the photodiodes in a direction orthogonal to the substrate, and are provided correspondingly to the respective photodiodes, an upper electrode provided across the photodiodes, a first auxiliary capacitor electrode provided between the substrate and each of the photodiodes in the direction orthogonal to the substrate, and a second auxiliary capacitor electrode that is provided in the same layer as that of the semiconductor layer or the source electrode, and faces the first auxiliary capacitor electrode with an insulating film interposed between the first auxiliary capacitor electrode and the second auxiliary capacitor electrode.

DETAILED DESCRIPTION

Figure 1:
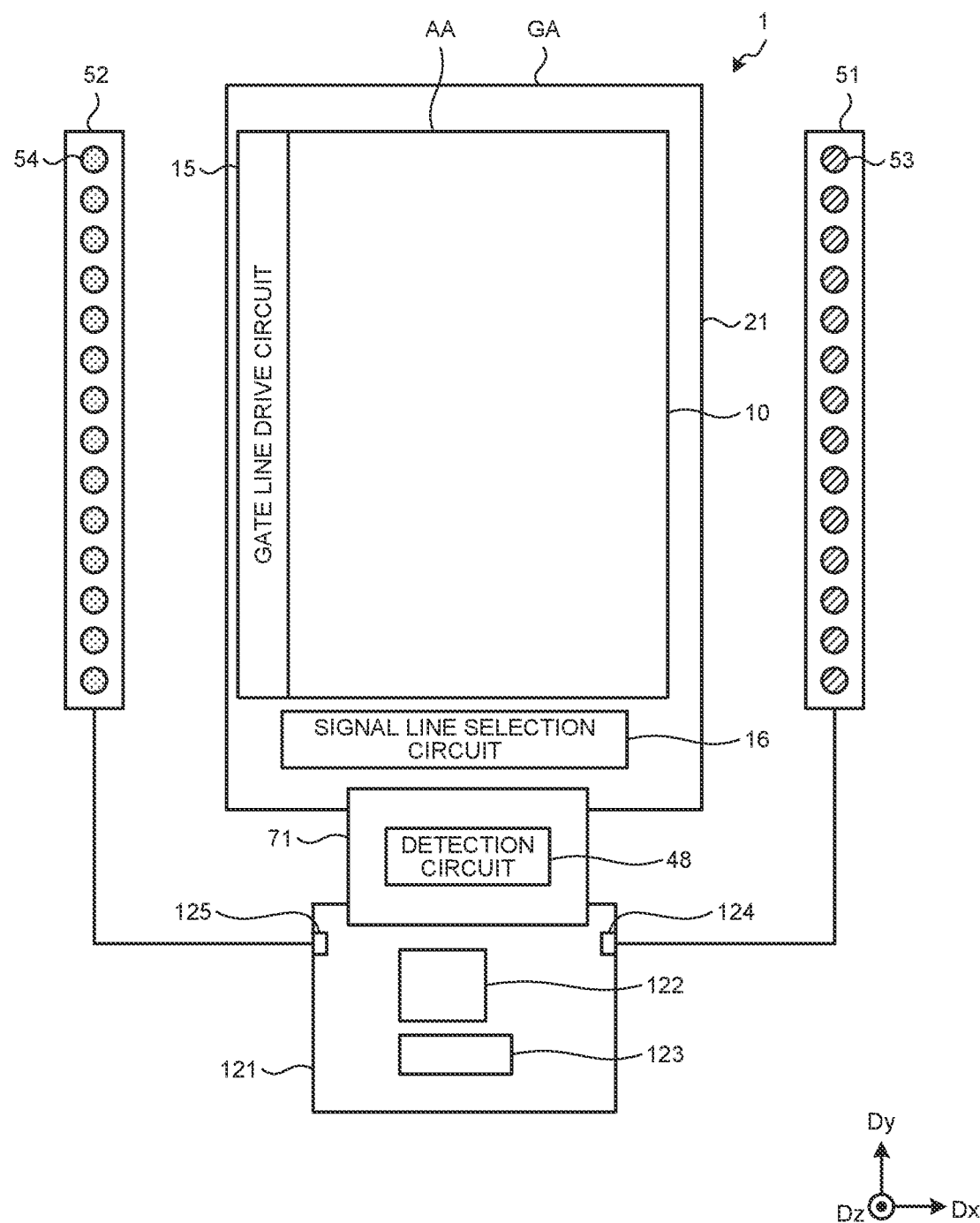
FIG. 1 is a plan view illustrating a detection device according to an embodiment.

The following describes a mode (embodiment) for carrying out the present disclosure in detail with reference to the drawings. The present disclosure is not limited to the description of the embodiment to be given below. Components to be described below include those easily conceivable by those skilled in the art or those substantially identical thereto. In addition, the components to be described below can be combined as appropriate. What is disclosed herein is merely an example, and the present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In the present specification and claims, in expressing an aspect of disposing another structure above a certain structure, a case of simply expressing "above" includes both a case of disposing the other structure immediately above the certain structure so as to contact the certain structure and a case of disposing the other structure above the certain structure with still another structure interposed therebetween, unless otherwise specified.

Embodiment

FIG. 1 is a plan view illustrating a detection device according to an embodiment. As illustrated in FIG. 1, a detection device 1 includes a substrate 21, a sensor 10, a gate line drive circuit 15, a signal line selection circuit 16, a detection circuit 48, a control circuit 122, a power supply circuit 123, a first light source base material 51, a second light source base material 52, first light sources 53, and second light sources 54. The first light source base material 51 is provided with the first light sources 53. The second light source base material 52 is provided with the second light sources 54.

The substrate 21 is electrically coupled to a control board 121 through a wiring board 71. The wiring board 71 is, for example, a flexible printed circuit board or a rigid circuit board. The wiring board 71 is provided with the detection circuit 48. The control board 121 is provided with the control circuit 122 and the power supply circuit 123. The control circuit 122 is, for example, a field-programmable gate array (FPGA). The control circuit 122 supplies control signals to the sensor 10, the gate line drive circuit 15, and the signal line selection circuit 16 to control a detection operation of the sensor 10. The control circuit 122 supplies control signals to the first and the second light sources 53 and 54 to control lighting or non-lighting of the first and the second light sources 53 and 54. The power supply circuit 123 supplies voltage signals including, for example, a sensor power supply signal VDDSNS (refer to FIG. 4) to the sensor 10, the gate line drive circuit 15, and the signal line selection circuit 16. The power supply circuit 123 supplies a power supply voltage to the first and the second light sources 53 and 54.

The substrate 21 has a detection area AA and a peripheral area GA. The detection area AA is an area provided with a plurality of photodiodes PD (refer to FIG. 4) included in the sensor 10. The peripheral area GA is an area between the outer perimeter of the detection area AA and the outer edges of the substrate 21, and is an area not provided with the photodiodes PD.

The gate line drive circuit 15 and the signal line selection circuit 16 are provided in the peripheral area GA. Specifically, the gate line drive circuit 15 is provided in an area extending along a second direction Dy in the peripheral area GA. The signal line selection circuit 16 is provided in an area extending along a first direction Dx in the peripheral area GA, and is provided between the sensor 10 and the detection circuit 48.

In the following description, the first direction Dx is one direction in a plane parallel to the substrate 21. The second direction Dy is one direction in the plane parallel to the substrate 21, and is a direction orthogonal to the first direction Dx. The second direction Dy may non-orthogonally intersect the first direction Dx. The term "plan view" refers to a positional relation when viewed from a direction orthogonal to the substrate 21.

The first light sources 53 are provided on the first light source base material 51, and are arranged along the second direction Dy. The second light sources 54 are provided on the second light source base material 52, and are arranged along the second direction Dy. The first light source base material 51 and the second light source base material 52 are electrically coupled, through terminals 124 and 125, respectively, provided on the control board 121, to the control circuit 122 and the power supply circuit 123.

For example, inorganic light-emitting diodes (LEDs) or organic electroluminescent (EL) diodes (organic light-emitting diodes (OLEDs)) are used as the first and the second light sources 53 and 54. The first and the second light sources 53 and 54 emit first and second light, respectively, having different wavelengths.

A first light emitted from the first light sources 53 is mainly reflected on a surface of an object to be detected, such as a finger, and is incident on the sensor 10. As a result, the sensor 10 can detect a fingerprint by detecting a shape of asperities on the surface of the finger or the like. A second light emitted from the second light sources 54 is mainly reflected in the finger or the like, or transmitted through the finger or the like, and is incident on the sensor 10. As a result, the sensor 10 can detect information on a living body such as the finger or the like. Examples of the information on the living body include a pulse wave, pulsation, and a vascular image of the finger or a palm. That is, the detection device 1 may be configured as a fingerprint detection device to detect the fingerprint or a vein detection device to detect a vascular pattern of, for example, veins.

The first light may have a wavelength of from 500 nm to 600 nm, for example, a wavelength of approximately 550 nm, and the second light may have a wavelength of from 780 nm to 950 nm, for example, a wavelength of approximately 850 nm. In this case, the first light is blue or green visible light, and the second light is infrared light. The sensor 10 can detect the fingerprint based on the first light emitted from the first light sources 53. The second light emitted from the second light sources 54 is reflected in the object to be detected, such as the finger, or transmitted through or absorbed by the finger or the like, and is incident on the sensor 10. As a result, the sensor 10 can detect the pulse wave or the vascular image (vascular pattern) as the information on the living body in the finger or the like.

Alternatively, the first light may have a wavelength of from 600 nm to 700 nm, for example, approximately 660 nm, and the second light may have a wavelength of from 780 nm to 900 nm, for example, approximately 850 nm. In this case, the sensor 10 can detect a blood oxygen saturation level in addition to the pulse wave, the pulsation, and the vascular image as the information on the living body based on the first light emitted from the first light sources 53 and the second light emitted from the second light sources 54. Thus, the detection device 1 includes the first and the second light sources 53 and 54, and therefore, can detect the various information on the living body by performing the detection based on the first light and the detection based on the second light.

The arrangement of the first and the second light sources 53 and 54 illustrated in FIG. 1 is merely an example, and can be changed as appropriate. The detection device 1 is provided with a plurality of types of light sources (first and second light sources 53 and 54) as the light sources. However, the light sources are not limited thereto, and may be of one type. For example, the first and the second light sources 53 and 54 may be arranged on each of the first light source base material 51 and the second light source base material 52. The first and the second light sources 53 and 54 may be provided on one light source base material, or three or more light source base materials. Alternatively, only at least one light source needs to be disposed.

The detection device 1 illustrated in FIG. 1 may be a transmissive detection device that detects light transmitted through the object to be detected, or may be a reflective detection device that detects light reflected by the object to be detected.

Figure 2:
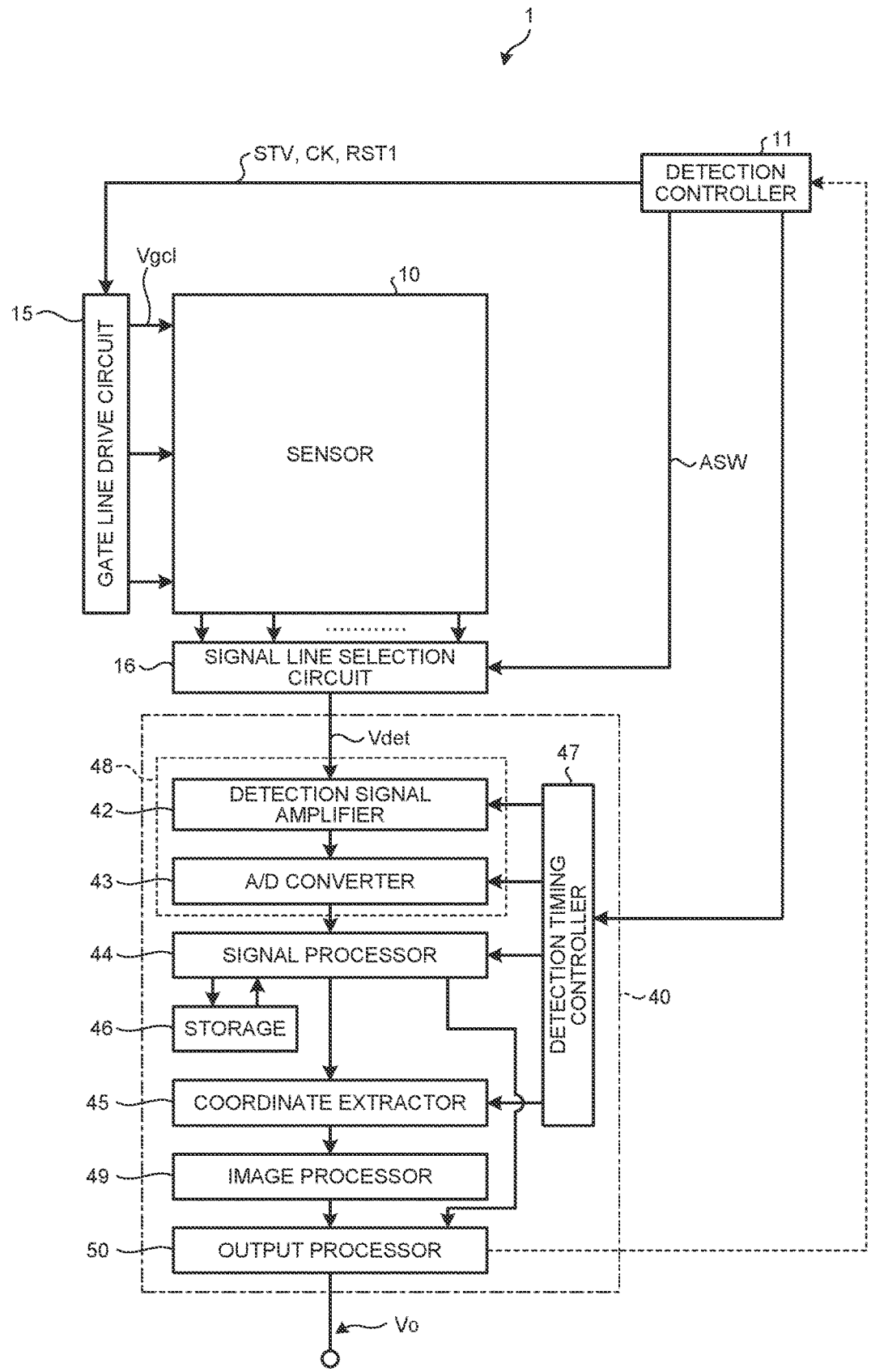
FIG. 2 is a block diagram illustrating a configuration example of the detection device according to the embodiment.

FIG. 2 is a block diagram illustrating a configuration example of the detection device according to the embodiment. As illustrated in FIG. 2, the detection device 1 further includes a detection controller 11 and a detector 40. The control circuit 122 includes one, some, or all functions of the detection controller 11. The control circuit 122 also includes one, some, or all functions of the detector 40 except those of the detection circuit 48.

The sensor 10 includes the photodiodes PD. Each of the photodiodes PD included in the sensor 10 outputs an electrical signal corresponding to light irradiating the photodiode PD as a detection signal Vdet to the signal line selection circuit 16. The sensor 10 performs the detection in response to a gate drive signal Vgcl supplied from the gate line drive circuit 15.

The detection controller 11 is a circuit that supplies respective control signals to the gate line drive circuit 15, the signal line selection circuit 16, and the detector 40 to control operations thereof. The detection controller 11 supplies various control signals such as a start signal STV, a clock signal CK, and a reset signal RST1 to the gate line drive circuit 15. The detection controller 11 also supplies various control signals such as a selection signal ASW to the signal line selection circuit 16. The detection controller 11 supplies various control signals to the first and the second light sources 53 and 54 to control the lighting and non-lighting of the respective first and second light sources 53 and 54.

The gate line drive circuit 15 is a circuit that drives a plurality of gate lines GCL (refer to FIG. 4) based on the various control signals. The gate line drive circuit 15 sequentially or simultaneously selects the gate lines GCL, and supplies the gate drive signals Vgcl to the selected gate lines GCL. Through this operation, the gate line drive circuit 15 selects the photodiodes PD coupled to the gate lines GCL.

Figure 4:
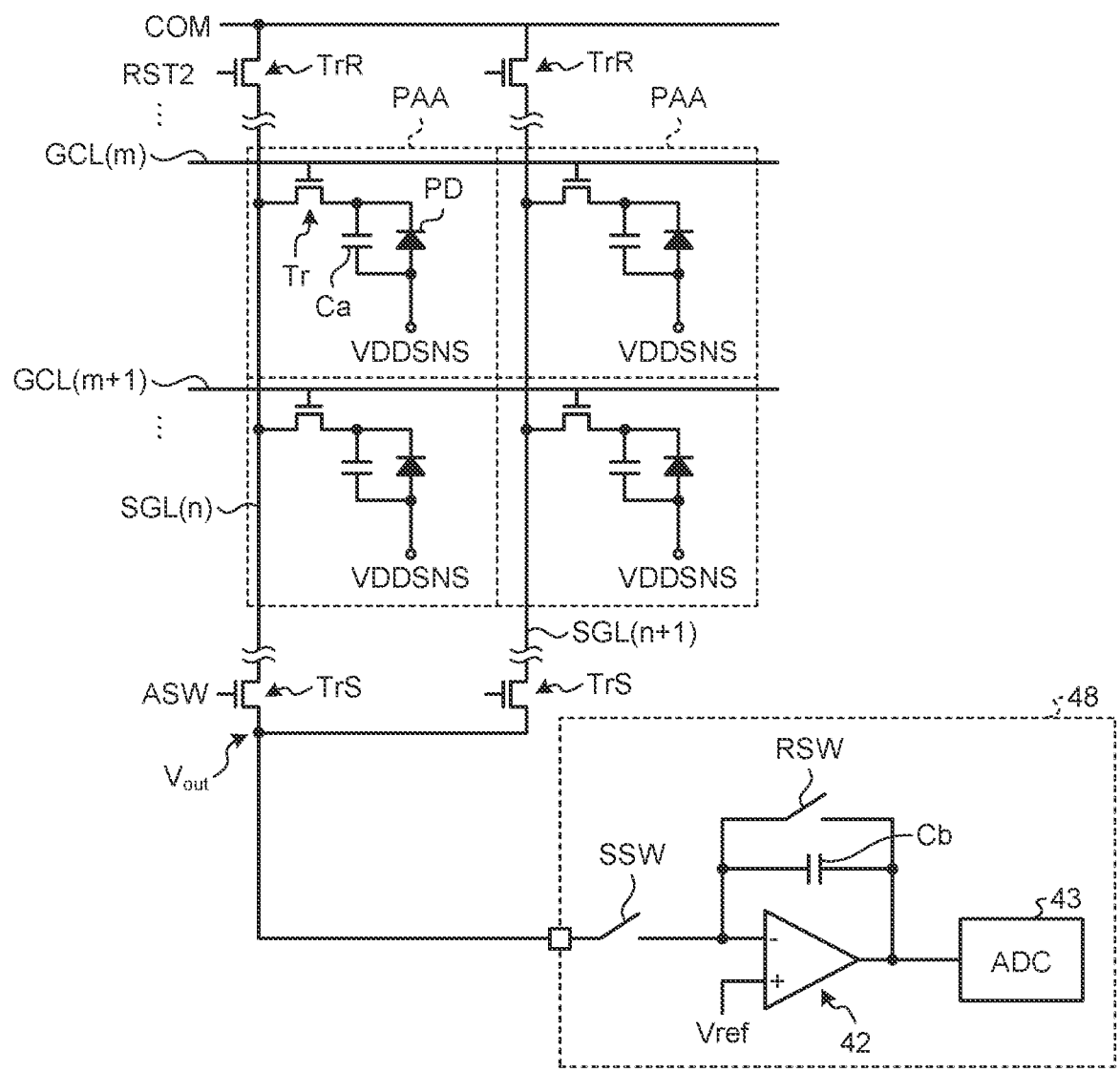
FIG. 4 is a circuit diagram illustrating a plurality of detection elements.

The signal line selection circuit 16 is a switch circuit that sequentially or simultaneously selects a plurality of signal lines SGL (refer to FIG. 4). The signal line selection circuit 16 is, for example, a multiplexer. The signal line selection circuit 16 couples the selected signal lines SGL to the detection circuit 48 based on the selection signal ASW supplied from the detection controller 11. Through this operation, the signal line selection circuit 16 outputs the detection signals Vdet of the photodiodes PD to the detector 40.

The detector 40 includes the detection circuit 48, a signal processor 44, a coordinate extractor 45, a storage 46, a detection timing controller 47, an image processor 49, and an output processor 50. Based on a control signal supplied from the detection controller 11, the detection timing controller 47 controls the detection circuit 48, the signal processor 44, the coordinate extractor 45, and the image processor 49 so as to operate in synchronization with one another.

The detection circuit 48 is, for example, an analog front-end (AFE) circuit. The detection circuit 48 is a signal processing circuit having functions of at least a detection signal amplifier 42 and an analog-to-digital (A/D) converter 43. The detection signal amplifier 42 amplifies the detection signals Vdet. The A/D converter 43 converts analog signals output from the detection signal amplifier 42 into digital signals.

The signal processor 44 is a logic circuit that detects a predetermined physical quantity received by the sensor 10 based on an output signal of the detection circuit 48. When the finger is in contact with or in proximity to a detection surface, the signal processor 44 can detect the asperities on the surface of the finger or the palm based on the signal from the detection circuit 48. The signal processor 44 can also detect the information on the living body based on the signal from the detection circuit 48. Examples of the information on the living body include the vascular image, the pulse wave, the pulsation, and the blood oxygen level of the finger or the palm.

The signal processor 44 may also perform processing of acquiring the detection signals Vdet (information on the living body) simultaneously detected by the photodiodes PD, and averaging the detection signals Vdet. In this case, the detector 40 can perform stable detection by reducing measurement errors caused by relative positional misalignment between the object to be detected, such as the finger, and the sensor 10.

The storage 46 temporarily stores therein signals calculated by the signal processor 44. The storage 46 may be, for example, a random-access memory (RAM) or a register circuit.

The coordinate extractor 45 is a logic circuit that obtains detected coordinates of the asperities on the surface of the finger or the like when the contact or the proximity of the finger is detected by the signal processor 44. The coordinate extractor 45 is also a logic circuit that obtains detected coordinates of blood vessels of the finger or the palm. The image processor 49 combines the detection signals Vdet output from the respective photodiodes PD of the sensor 10 to generate two-dimensional information representing the shape of the asperities on the surface of the finger or the like and two-dimensional information representing the shape of the blood vessels of the finger or the palm. The coordinate extractor 45 may output the detection signals Vdet as sensor output voltages Vo instead of calculating the detected coordinates. A case can be considered where the detector 40 does not include the coordinate extractor 45 and the image processor 49.

The output processor 50 serves as a processor that performs processing based on the outputs from the photodiodes PD. The output processor 50 may include, for example, the detected coordinates obtained by the coordinate extractor 45 and the two-dimensional information generated by the image processor 49 in the sensor output voltages Vo. The function of the output processor 50 may be integrated into another component (such as the image processor 49).

Figure 3:
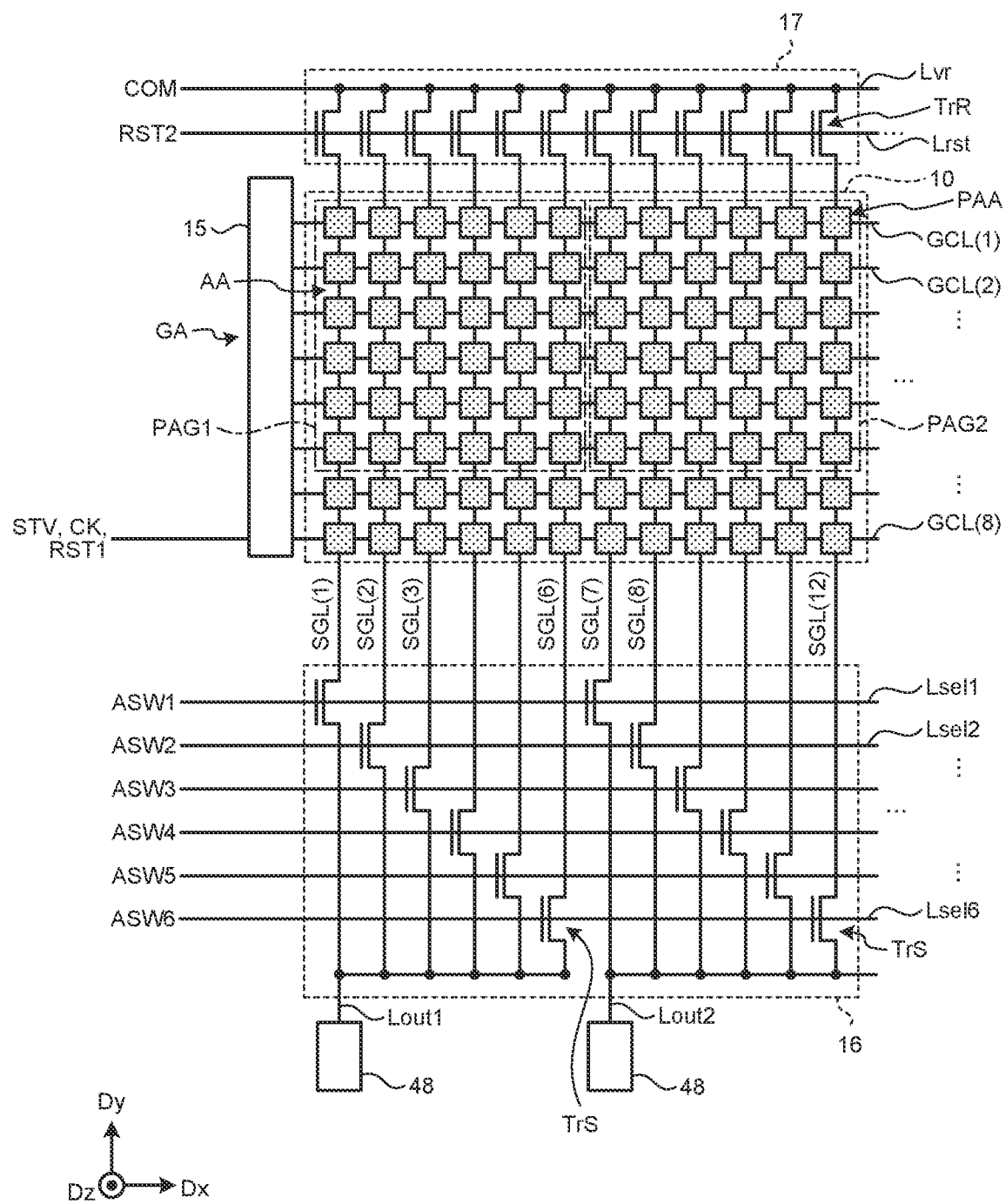
FIG. 3 is a circuit diagram illustrating the detection device.

The following describes a circuit configuration example of the detection device 1. FIG. 3 is a circuit diagram illustrating the detection device. As illustrated in FIG. 3, the sensor 10 includes a plurality of detection elements PAA arranged in a matrix having a row-column configuration. Each of the detection elements PAA is provided with the photodiode PD. The detection elements PAA including the photodiodes PD are arranged above the substrate 21. Each of the photodiodes PD is an organic photodiode (OPD) using an organic semiconductor.

The gate lines GCL extend in the first direction Dx, and are coupled to the detection elements PAA arranged in the first direction Dx. A plurality of gate lines GCL(1), GCL(2), ..., GCL(8) are arranged in the second direction Dy, and are each coupled to the gate line drive circuit 15. In the following description, the gate lines GCL(1), GCL(2), ..., GCL(8) will each be simply referred to as the gate line GCL when need not be distinguished from one another. For ease of understanding of the description, FIG. 3 illustrates eight of the gate lines GCL. However, this is merely an example, and M (where M is eight or larger, and is, for example, 256) of the gate lines GCL may be arranged.

The signal lines SGL extend in the second direction Dy, and are coupled to the photodiodes PD of the detection elements PAA arranged in the second direction Dy. A plurality of signal lines SGL(1), SGL(2), ..., SGL(12) are arranged in the first direction Dx, and are each coupled to the signal line selection circuit 16 and a reset circuit 17. In the following description, the signal lines SGL(1), SGL(2), ..., SGL(12) will each be simply referred to as the signal line SGL when need not be distinguished from one another.

For ease of understanding of the description, 12 of the signal lines SGL are illustrated. However, this is merely an example, and N (where N is 12 or larger, and is, for example, 252) of the signal lines SGL may be arranged. The resolution of the sensor is, for example, 508 dots per inch (dpi), and the number of cells is 252×256. In FIG. 3, the sensor 10 is provided between the signal line selection circuit 16 and the reset circuit 17. The present disclosure is not limited thereto. The signal line selection circuit 16 and the reset circuit 17 may be coupled to ends of the signal lines SGL in the same direction.

The gate line drive circuit 15 receives the various control signals such as the start signal STV, the clock signal CK, and the reset signal RST1 from the control circuit 122 (refer to FIG. 1). The gate line drive circuit 15 sequentially selects the gate lines GCL(1), GCL(2), . . . , GCL(8) in a time-division manner based on the various control signals. The gate line drive circuit 15 supplies the gate drive signal Vgcl to the selected one of the gate lines GCL. This operation supplies the gate drive signal Vgcl to a plurality of first switching elements Tr coupled to the gate line GCL, and corresponding ones of the detection elements PAA arranged in the first direction Dx are selected as detection targets.

The signal line selection circuit 16 includes a plurality of selection signal lines Lsel, a plurality of output signal lines Lout, and third switching elements TrS. The third switching elements TrS are provided correspondingly to the respective signal lines SGL. Six of the signal lines SGL(1), SGL(2), . . . , SGL(6) are coupled to a common output signal line Lout1. Six of the signal lines SGL(7), SGL(8), . . . , SGL(12) are coupled to a common output signal line Lout2. The output signal lines Lout1 and Lout2 are each coupled to the detection circuit 48.

The signal lines SGL(1), SGL(2), . . . , SGL(6) are grouped into a first signal line block, and the signal lines SGL(7), SGL(8), . . . , SGL(12) are grouped into a second signal line block. The selection signal lines Lsel are coupled to the gates of the respective third switching elements TrS included in one of the signal line blocks. One of the selection signal lines Lsel is coupled to the gates of the third switching elements TrS in the signal line blocks.

The control circuit 122 (refer to FIG. 1) sequentially supplies the selection signal ASW to the selection signal lines Lsel. This operation causes the signal line selection circuit 16 to operate the third switching elements TrS to sequentially select the signal lines SGL in one of the signal line blocks in a time-division manner. The signal line selection circuit 16 selects one of the signal lines SGL in each of the signal line blocks. With the above-described configuration, the detection device 1 can reduce the number of integrated circuits (ICs) including the detection circuit 48 or the number of terminals of the ICs. The signal line selection circuit 16 may couple a plurality of the signal lines SGL in a bundle to the detection circuit 48.

As illustrated in FIG. 3, the reset circuit 17 includes a reference signal line Lvr, a reset signal line Lrst, and fourth switching elements TrR. The fourth switching elements TrR are provided correspondingly to the signal lines SGL. The reference signal line Lvr is coupled to either the sources or the drains of the fourth switching elements TrR. The reset signal line Lrst is coupled to the gates of the fourth switching elements TrR.

The control circuit 122 supplies a reset signal RST2 to the reset signal line Lrst. This operation turns on the fourth switching elements TrR to electrically couple the signal lines SGL to the reference signal line Lvr. The power supply circuit 123 supplies a reference signal COM to the reference signal line Lvr. This operation supplies the reference signal COM to a capacitive element Ca (refer to FIG. 4) included in each of the detection elements PAA.

Figure 5:
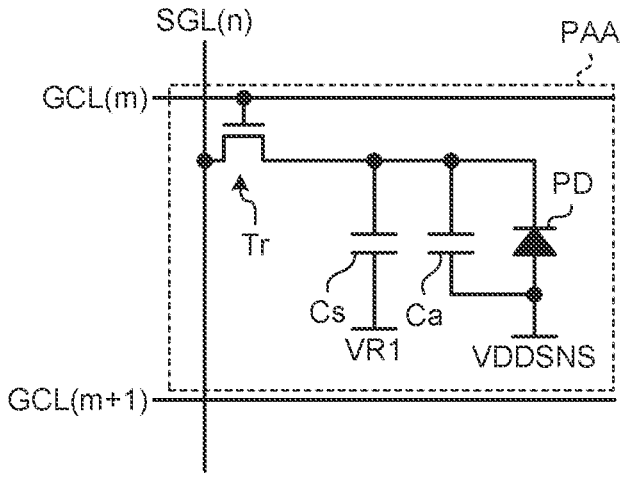
FIG. 5 is a circuit diagram illustrating one of the detection elements in a magnified manner.

FIG. 4 is a circuit diagram illustrating the detection elements. FIG. 5 is a circuit diagram illustrating one of the detection elements in a magnified manner. FIG. 4 also illustrates a circuit configuration of the detection circuit 48. FIG. 4 does not illustrate an auxiliary capacitor Cs illustrated in FIG. 5. As illustrated in FIGS. 4 and 5, each of the detection elements PAA includes the photodiode PD, the capacitive element Ca, the auxiliary capacitor Cs, and a corresponding one of the first switching elements Tr. The capacitive element Ca is capacitance (sensor capacitance) generated in the photodiode PD, and is equivalently coupled in parallel with the photodiode PD. In more detail, the capacitive element Ca is capacitance generated between a lower electrode 23 (refer to FIG. 8) and an upper electrode 24 of the photodiode PD.

The auxiliary capacitor Cs is capacitance added to the photodiode PD. One end side of the auxiliary capacitor Cs is coupled to one end side of the capacitive element Ca and the cathode (lower electrode 23) of the photodiode PD. The other end side of the auxiliary capacitor Cs is supplied with a reference potential VR1. The reference potential VR1 is a voltage signal having a fixed potential, and may be, for example, a ground potential or a reset potential (reference signal COM). Specific configuration examples of the auxiliary capacitor Cs will be described with reference to FIG. 7 and subsequent drawings.

FIG. 4 illustrates two gate lines GCL(m) and GCL(m+1) arranged in the second direction Dy among the gate lines GCL. FIG. 4 also illustrates two signal lines SGL(n) and SGL(n+1) arranged in the first direction Dx among the signal lines SGL. The detection element PAA is an area surrounded by the gate lines GCL and the signal lines SGL.

Each of the first switching elements Tr is provided correspondingly to the photodiode PD. The first switching element Tr is constituted by a thin-film transistor, and in this example, constituted by an n-channel metal oxide semiconductor (MOS) thin-film transistor (TFT).

The gates of the first switching elements Tr belonging to the detection elements PAA arranged in the first direction Dx are coupled to the gate line GCL. The sources of the first switching elements Tr belonging to the detection elements PAA arranged in the second direction Dy are coupled to the signal line SGL. The drain of the first switching element Tr is coupled to the cathode of the photodiode PD and the capacitive element Ca.

The anode of the photodiode PD is supplied with the sensor power supply signal VDDSNS from the power supply circuit 123. The signal line SGL and the capacitive element Ca are supplied with the reference signal COM that serves as an initial potential of the signal line SGL and the capacitive element Ca from the power supply circuit 123.

When the detection element PAA is irradiated with light, a current corresponding to the amount of the light flows through the photodiode PD. As a result, electric charges are stored in the capacitive element Ca and the auxiliary capacitor Cs (refer to FIG. 5). After the first switching element Tr is turned on, a current corresponding to the electric charges stored in the capacitive element Ca and the auxiliary capacitor Cs (refer to FIG. 5) flows through the signal line SGL. The signal line SGL is coupled to the detection circuit 48 through a corresponding one of the third switching elements TrS of the signal line selection circuit 16. Thus, the detection device 1 can detect an output signal $V_{out}$ corresponding to the amount of the light irradiating the photodiode PD in each of the detection elements PAA or each of the block units PAG.

During a reading period, a switch SSW is turned on to couple the detection circuit 48 to the signal line SGL. The detection signal amplifier 42 of the detection circuit 48 converts a variation of a current supplied from the signal lines SGL into a variation of a voltage, and amplifies the result. A reference potential (Vref) having a fixed potential is supplied to a non-inverting input terminal (+) of the detection signal amplifier 42, and the signal lines SGL are coupled to an inverting input terminal (−) of the detection signal amplifier 42. In the embodiment, the same signal as the reference signal COM is supplied as the reference potential (Vref) voltage. The signal processor 44 (refer to FIG. 3) calculates the difference between the detection signal Vdet when light irradiates the photodiode PD and the detection signal Vdet when light does not irradiate the photodiode PD as each of the sensor output voltages Vo. The detection signal amplifier 42 includes a capacitive element Cb and a reset switch RSW. During a reset period, the reset switch RSW is turned on to reset an electric charge of the capacitive element Cb.

Figure 6:
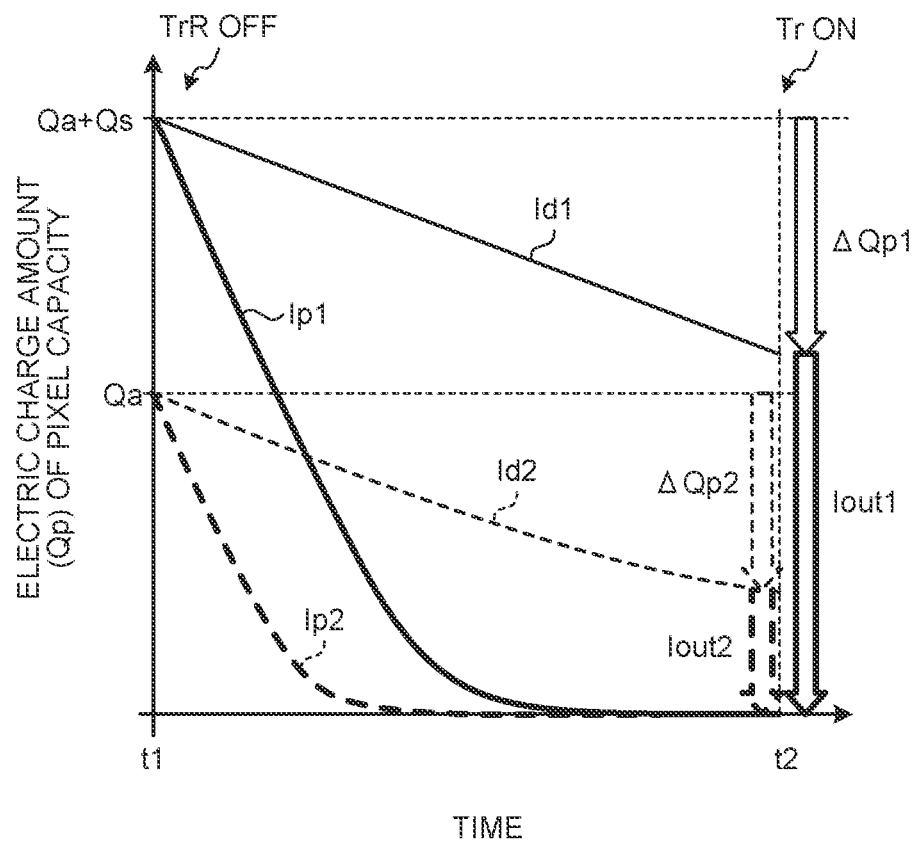
FIG. 6 is a graph schematically illustrating a relation between an amount of electric charge of a pixel capacity and time.

FIG. 6 is a graph schematically illustrating a relation between an electric charge amount of a pixel capacity and time. The vertical axis of the graph illustrated in FIG. 6 indicates a total electric charge amount Qp of the capacitive element Ca and the auxiliary capacitor Cs (or, the vertical axis indicates the pixel capacity included in each of the detection elements PAA). The horizontal axis of the graph illustrated in FIG. 6 indicates the time from time t1 when one of the fourth switching elements TrR is turned off to time t2 when a corresponding one of the first switching elements Tr is turned on. That is, FIG. 6 is a graph schematically illustrating the change in the electric charge amount Qp from the end of the reset period of the detection elements PAA until the start of the reading period.

As illustrated in FIG. 6, during the reading period, the electric charge amount Qp (=Qa+Qs) stored in the capacitive element Ca and the auxiliary capacitor Cs at time t1 desirably flows through the signal line SGL. A current Ip1 when the capacitive element Ca and the auxiliary capacitor Cs are set is illustrated by a solid line. In FIG. 6, as a comparative example, a dotted line indicates a current Ip2 that flows when the auxiliary capacitor Cs is not provided. In the present embodiment, the current Ip1 larger than the current Ip2 flows because the auxiliary capacitor Cs is provided.

In reality, after the reset period ends at time t1, a dark current Id1 (also called "leakage current") flows from the capacitive element Ca and the auxiliary capacitor Cs to the photodiode PD until time t2 when the read period starts. As a result, the electric charge amount decreases from the electric charge amount Qp (=Qa+Qs) at time t1 by an electric charge amount ΔQp1 corresponding to the dark current Id1. At time t2, a sensor current Iout1 corresponding to an electric charge amount (Qa+Qs−ΔQp1) is output to the detection circuit 48 (refer to FIG. 4) through the signal line SGL.

Also, in the comparative example in which the auxiliary capacitor Cs is not provided, a dark current Id2 flows from the capacitive element Ca to the photodiode PD. As a result, the electric charge amount decreases from an electric charge amount Qa at time t1 by an electric charge amount ΔQp2 corresponding to the dark current Id2. At time t2, a sensor current Iout2 corresponding to an electric charge amount (Qa−ΔQp2) is output to the detection circuit 48 (refer to FIG. 4) through the signal line SGL.

Since the auxiliary capacitor Cs is provided in the present embodiment, the maximum value of the electric charge amount Qp (=Qa+Qs) stored in the capacitive element Ca and the auxiliary capacitor Cs is larger than in the comparative example. As a result, even when the dark current Id1 flows in the same manner as in the comparative example, the electric charge amount Qp of the capacitive element Ca and the auxiliary capacitor Cs after the lapse of a predetermined time is larger than in the comparative example. That is, the maximum value of the output signal $V_{out}$ (refer to FIG. 4) increases because the sensor current Iout1 output from the detection element PAA can be increased in the reading period. Therefore, the detection device 1 can improve the detection sensitivity.

Figure 7:
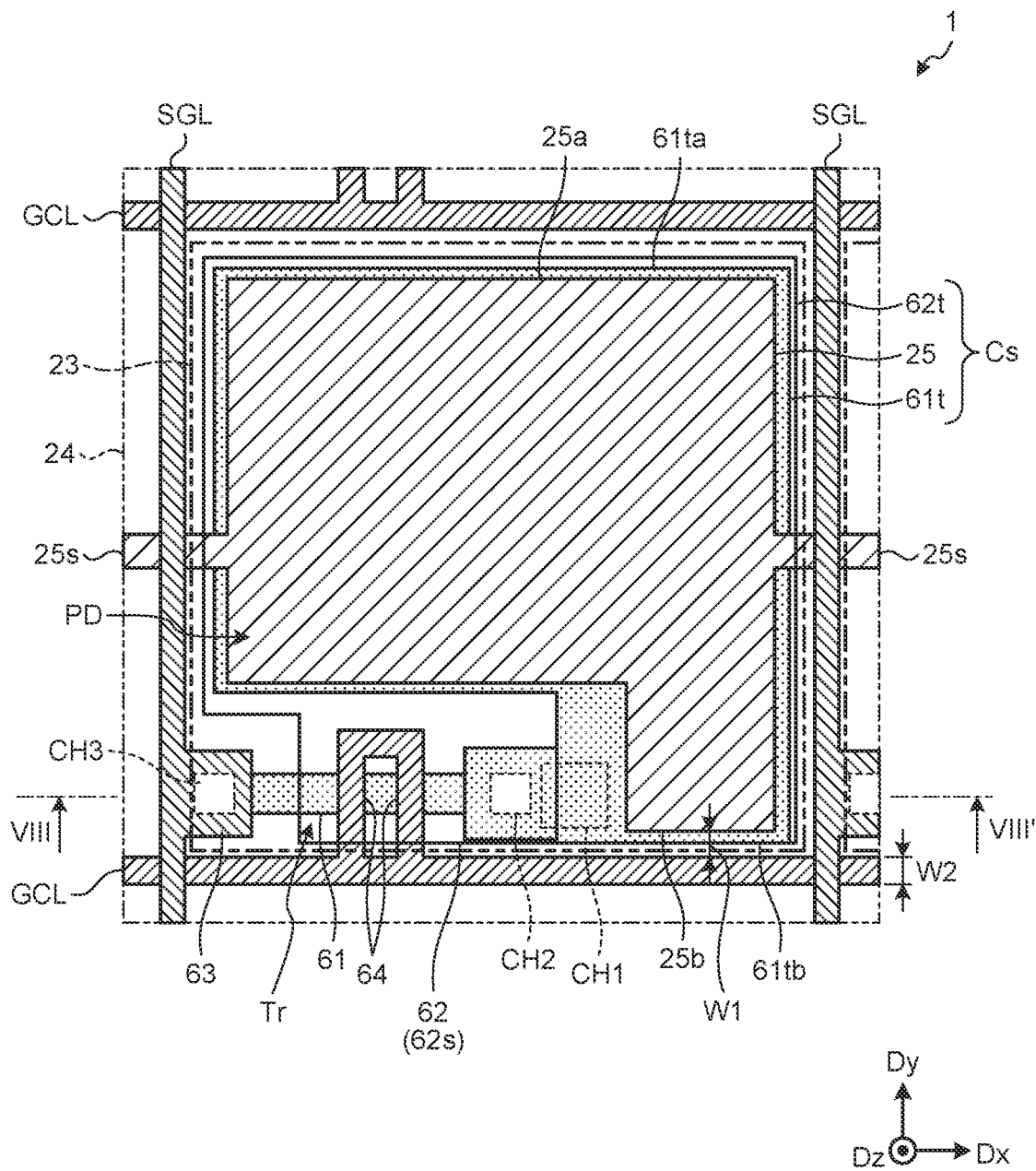
FIG. 7 is a plan view schematically illustrating the detection device according to the embodiment.

The following describes a configuration of the photodiode PD. FIG. 7 is a plan view schematically illustrating the detection device according to the embodiment. In FIG. 7, for ease of viewing the drawing, a first auxiliary capacitor electrode 25 and a second auxiliary capacitor electrode 61t are illustrated with hatching. In addition, the lower electrode 23 and the upper electrode 24 are illustrated with long dashed double-short dashed lines.

As illustrated in FIG. 7, the photodiode PD, the lower electrode 23, and the first switching element Tr are provided in the area surrounded by the gate lines GCL and signal lines SGL. The detection device 1 further includes the first auxiliary capacitor electrode 25, the second auxiliary capacitor electrode 61t, and a third auxiliary capacitor electrode 62t. The first auxiliary capacitor electrode 25, the second auxiliary capacitor electrode 61t, and the third auxiliary capacitor electrode 62t are provided in the area surrounded by the gate lines GCL and signal lines SGL so as to overlap the lower electrode 23. The auxiliary capacitor Cs is formed between the first auxiliary capacitor electrode 25 and the third auxiliary capacitor electrode 62t with the interlayer insulating film 93 interposed therebetween, and between the first auxiliary capacitor electrode 25 and the second auxiliary capacitor electrode 61t with the gate insulating film 92 interposed therebetween. A layered configuration of the first auxiliary capacitor electrode 25, the second auxiliary capacitor electrode 61t, and the third auxiliary capacitor electrode 62t will be described later.

The lower electrode 23 is a cathode electrode of the photodiode PD. The photodiodes PD and the lower electrodes 23 are arranged in a matrix having a row-column configuration above the substrate 21. As illustrated in FIG. 6, the lower electrode 23 is formed to have an area smaller than the area defined by the gate lines GCL and the signal lines SGL, and is provided so as to overlap at least a portion of the first switching element Tr. The lower electrode 23 illustrated in FIG. 7 is merely an example, and can be changed as appropriate according to the characteristics required for the photodiode PD. For example, the lower electrode 23 may be provided so as to overlap at least one of the gate line GCL and the signal line SGL. Alternatively, the lower electrode 23 may be formed to have an area smaller than the area illustrated in FIG. 7. In this case, the leakage current can be reduced although the capacitance of the capacitive element Ca decreases.

As illustrated in FIG. 7, the first switching element Tr includes a semiconductor layer 61, a source electrode 62, a drain electrode 63, and gate electrodes 64. The semiconductor layer 61 extends along the gate line GCL, and is provided so as to intersect the gate electrodes 64 in the plan view. The gate electrodes 64 are coupled to the gate line GCL, and extend in a direction orthogonal to the gate line GCL. The two gate electrodes 64 are arranged side by side in the first direction Dx. The first switching element Tr of the present embodiment has a double-gate structure in which the two gate electrodes 64 are provided so as to overlap the semiconductor layer 61.

One end side of the semiconductor layer 61 is coupled to the source electrode 62 through a second contact hole CH2. The lower electrode 23 is electrically coupled to the source electrode 62 of the first switching element Tr through a first contact hole CH1. As a result, the first switching element Tr is electrically coupled to the photodiode PD. The other end side of the semiconductor layer 61 is coupled to the drain electrode 63 through a third contact hole CH3. The drain electrode 63 is coupled to the signal line SGL.

The configuration and the arrangement of the first switching element Tr illustrated in FIG. 7 are merely exemplary, and can be changed as appropriate.

The first auxiliary capacitor electrode 25 is provided in the same layer as that of the gate lines GCL and gate electrodes 64. The first auxiliary capacitor electrode 25 is provided so as to be separate from the gate lines GCL and the gate electrodes 64. The first auxiliary capacitor electrode 25 is provided so as to overlap the second auxiliary capacitor electrode 61t and the third auxiliary capacitor electrode 62t in the plan view. In more detail, the first auxiliary capacitor electrode 25 includes a first portion 25a, a second portion 25b, and a coupling portion 25s. The first portion 25a is a rectangular portion that is arranged adjacent to the first switching element Tr in the second direction Dy, and is provided in an area surrounded by the first switching element Tr, the gate line GCL, and the signal lines SGL.

The second portion 25b is formed so as to project in the second direction Dy from the first portion 25a, and is arranged adjacent to the first switching element Tr in the first direction Dx. A distance W1 between the first auxiliary capacitor electrode 25 (second portion 25b) and the gate line GCL adjacent to each other in the second direction Dy is equal to or smaller than a width W2 in the second direction Dy of the gate line GCL.

The coupling portion 25s is provided so as to intersect the signal line SGL in the plan view, and couples together the first auxiliary capacitor electrodes 25 (first portions 25a) adjacent to each other in the first direction Dx. The width in the second direction Dy of the coupling portion 25s is smaller than the width in the second direction Dy of the first portion 25a. The coupling portion 25s is formed to have, for example, the same width in the second direction Dy as the width W2 in the second direction Dy of the gate line GCL. The first auxiliary capacitor electrodes 25 coupled together by the coupling portions 25s are coupled to the reference potential VR1 (refer to FIG. 5) at any location.

The second auxiliary capacitor electrode 61t is provided in the same layer as that of the semiconductor layer 61, and is coupled to the semiconductor layer 61. The second auxiliary capacitor electrode 61t includes a first portion 61ta and a second portion 61tb. The first portion 61ta is arranged adjacent to the first switching element Tr in the second direction Dy, and is provided so as to overlap the first portion 25a of the first auxiliary capacitor electrode 25.

The second portion 61tb is formed so as to project in the second direction Dy from the first portion 61ta. The second portion 61tb is arranged adjacent to the first switching element Tr in the first direction Dx, and is coupled to the semiconductor layer 61. The second auxiliary capacitor electrode 61t is provided so as to be separate from the gate line GCL and the gate electrodes 64 in the plan view. In other words, the second auxiliary capacitor electrode 61t is provided in an island pattern for each of the detection elements PAA.

The third auxiliary capacitor electrode 62t is provided in the same layer as that of the signal line SGL and the source electrode 62, and is coupled to the source electrode 62. The third auxiliary capacitor electrode 62t is provided in an area overlapping the first auxiliary capacitor electrode 25 and the second auxiliary capacitor electrode 61t. The source electrode 62 includes an overlapping portion 62s that overlaps the gate electrodes 64. The third auxiliary capacitor electrode 62t and the source electrode 62 (overlapping portion 62s) are provided so as to cover the area defined by the gate lines GCL and the signal lines SGL, and are arranged so as to be separate from the gate lines GCL and the signal lines SGL. The first auxiliary capacitor electrode 25 and the second auxiliary capacitor electrode 61t cover the area defined by the gate lines GCL and the signal lines SGL except an area provided with the first switching element Tr. This configuration provides a large capacitance value of the auxiliary capacitor Cs.

The area in the plan view increases in the order of the first auxiliary capacitor electrode 25, the second auxiliary capacitor electrode 61t, and the third auxiliary capacitor electrode 62t. However, FIG. 7 is merely an example, and the shapes and the areas of the first auxiliary capacitor electrode 25, the second auxiliary capacitor electrode 61t, and the third auxiliary capacitor electrode 62t can be changed as appropriate according to, for example, the characteristics and the detection sensitivity required for the detection device 1.

Figure 8:
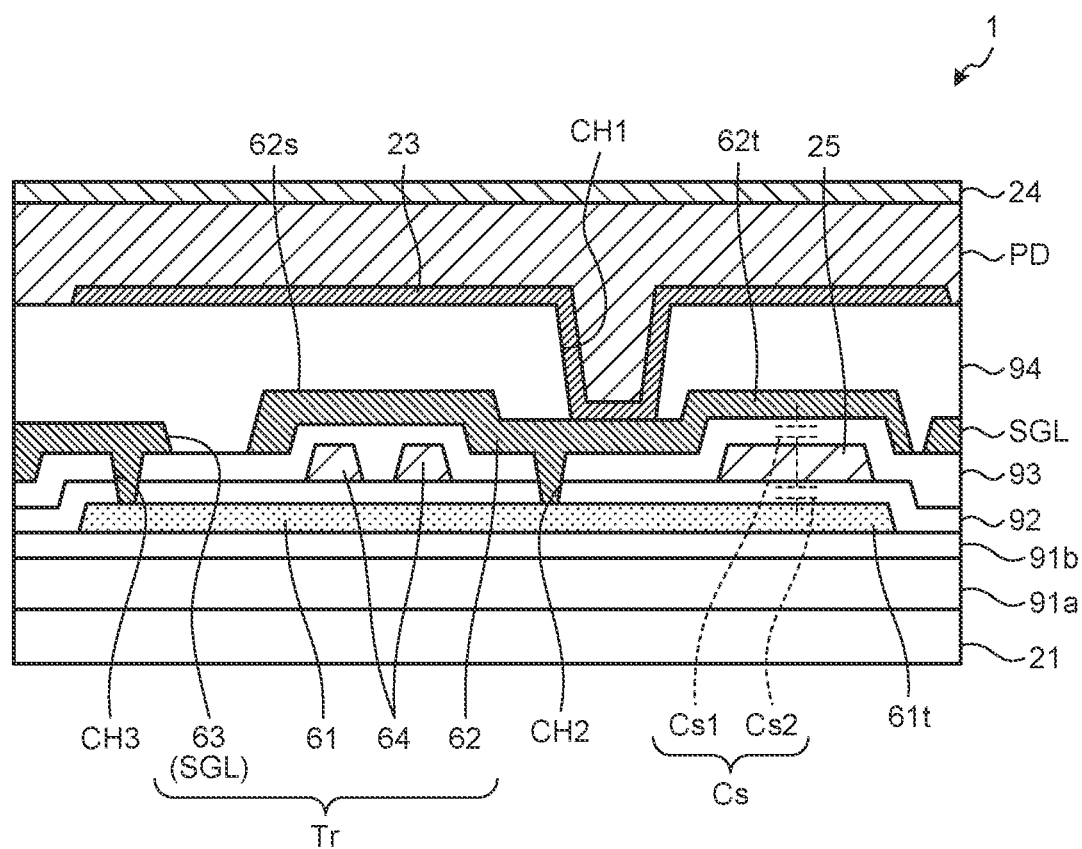
FIG. 8 is an VIII-VIII' sectional view of FIG. 7.

FIG. 8 is an VIII-VIII' sectional view of FIG. 7. As illustrated in FIG. 8, the detection device 1 includes the substrate 21, the first switching element Tr, an organic insulating film 94, the lower electrode 23, the photodiode PD, and the upper electrode 24. The first auxiliary capacitor electrode 25, the second auxiliary capacitor electrode 61t, and the third auxiliary capacitor electrode 62t are provided between the substrate 21 and the photodiode PD in a direction orthogonal to the substrate 21. Although not illustrated in FIG. 8, a sealing film covering the photodiode PD and the upper electrode 24 is provided as needed.

The substrate 21 is an insulating base material, and is made using, for example, glass or a resin material. The substrate 21 is not limited to having a flat plate shape, and may have a curved surface. In this case, the substrate 21 may be a film-like resin.

In this specification, a direction from the substrate 21 toward the photodiode PD in a direction orthogonal to a surface of the substrate 21 is referred to as "upper side" or simply "above". A direction from the photodiode PD toward the substrate 21 is referred to as "lower side" or simply "below".

Undercoat films 91a and 91b are provided above the substrate 21. The undercoat films 91a and 91b are each formed of, for example, an inorganic insulating film such as a silicon nitride film or a silicon oxide film. The undercoat films 91a and 91b are not limited to being configured as a multilayered film having two stacked layers of inorganic insulating films, and may be a multilayered film having three or more layers, or alternatively be a single-layer film. A light-blocking film may be provided between the substrate 21 and the semiconductor layer 61.

The first switching elements Tr (transistors) are provided above the substrate 21. Each of the first switching elements Tr is provided by stacking the semiconductor layer 61, the gate electrodes 64, the source electrode 62, and the drain electrode 63 in this order above the substrate 21. More specifically, the semiconductor layer 61 is provided above the undercoat film 91b. For example, polysilicon is used as the semiconductor layer 61. The semiconductor layer 61 is, however, not limited thereto, and may be formed of, for example, a microcrystalline oxide semiconductor, an amorphous oxide semiconductor, or low-temperature polysilicon. Although only an n-type TFT is illustrated as the first switching element Tr, a p-type TFT may be formed at the same time.

A gate insulating film 92 is provided above the undercoat film 91b so as to cover the semiconductor layer 61. The gate insulating film 92 is, for example, an inorganic insulating film such as a silicon oxide film. The gate electrodes 64 are provided above the gate insulating film 92. In the example illustrated in FIG. 7 the first switching element Tr has a top-gate structure. However, the first switching element Tr is not limited thereto, and may have a bottom-gate structure, or a dual-gate structure in which the gate electrodes 64 are provided both above and below the semiconductor layer 61.

An interlayer insulating film 93 is provided above the gate insulating film 92 so as to cover the gate electrodes 64. The interlayer insulating film 93 has, for example, a multilayered structure of a silicon nitride film and a silicon oxide film. The source electrode 62 and the drain electrode 63 are provided above the interlayer insulating film 93. The source electrode 62 is coupled to a source area of the semiconductor layer 61 through the second contact hole CH2 provided in the gate insulating film 92 and the interlayer insulating film 93. The drain electrode 63 is coupled to a drain area of the semiconductor layer 61 through the third contact hole CH3 provided in the gate insulating film 92 and the interlayer insulating film 93.

The first auxiliary capacitor electrode 25, the second auxiliary capacitor electrode 61t, and the third auxiliary capacitor electrode 62t forming the auxiliary capacitor Cs are provided in the same layers as those of the first switching element Tr (transistor). Specifically, the second auxiliary capacitor electrode 61t is formed in the same layer as that of the semiconductor layer 61 so as to be continuous with the semiconductor layer 61. That is, the second auxiliary capacitor electrode 61t is provided above the undercoat film 91b.

The first auxiliary capacitor electrode 25 is provided in the same layer as that of the gate electrodes 64 so as to be separate from the gate electrodes 64. That is, the first auxiliary capacitor electrode 25 is provided above the gate insulating film 92, and faces the second auxiliary capacitor electrode 61t with the gate insulating film 92 interposed therebetween in the direction orthogonal to the substrate 21. This configuration generates an auxiliary capacitor Cs2 between the first auxiliary capacitor electrode 25 and the second auxiliary capacitor electrode 61t.

The third auxiliary capacitor electrode 62t is formed in the same layer as that of the source electrode 62 so as to be continuous with the source electrode 62. That is, the third auxiliary capacitor electrode 62t is provided above the interlayer insulating film 93, and faces the first auxiliary capacitor electrode 25 with the interlayer insulating film 93 interposed therebetween in the direction orthogonal to the substrate 21. This configuration generates an auxiliary capacitor Cs1 between the first auxiliary capacitor electrode 25 and the third auxiliary capacitor electrode 62t.

In the present embodiment, the second auxiliary capacitor electrode 61t, the gate insulating film 92, the first auxiliary capacitor electrode 25, the interlayer insulating film 93, and the third auxiliary capacitor electrode 62t are stacked in this order in the direction orthogonal to the substrate 21. The auxiliary capacitor Cs has the total capacitance of the auxiliary capacitor Cs1 and the auxiliary capacitor Cs2 generated between the layers.

The overlapping portion 62s is formed in the same layer as that of the source electrode 62 so as to be continuous with the source electrode 62, and is provided in an area overlapping the gate electrodes 64. In other words, a portion of the source electrode 62 that overlaps the gate electrodes 64 can be denoted as the overlapping portion 62s. The overlapping portion 62s can restrain light from irradiating the semiconductor layer 61.

The organic insulating film 94 is provided above the interlayer insulating film 93 so as to cover the source electrode 62 of the first switching element Tr, the third auxiliary capacitor electrode 62t, and the drain electrode 63. The organic insulating film 94 is an organic planarizing film, and has a better coverage property for wiring steps and provides better surface flatness than inorganic insulating materials formed by, for example, chemical vapor deposition (CVD).

The photodiodes PD are provided above the organic insulating film 94. The lower electrode 23 is provided between both the substrate 21 and the organic insulating film 94 and the photodiode PD in the direction orthogonal to the surface of the substrate 21.

In more detail, the lower electrode 23 is provided above the organic insulating film 94, and is provided so as to cover the bottom surface and the inner side surface of the first contact hole CH1 formed in the organic insulating film 94. The lower electrode 23 is coupled to the source electrode 62 of the first switching element Tr on the bottom surface of the first contact hole CH1. The lower electrode 23 is the cathode electrode of the photodiode PD, and is formed of a metal material such as silver (Ag). As a result, the lower electrode 23 serves as a reflective electrode.

The lower electrodes 23 are arranged so as to be separated for each of the detection elements PAA (photodiodes PD). The lower electrode 23 is provided so as to overlap the first auxiliary capacitor electrode 25, the second auxiliary capacitor electrode 61t, and the third auxiliary capacitor electrode 62t. The photodiode PD has a larger area than that of the lower electrode 23 in the plan view, and covers the upper surface and outer edges of the lower electrode 23.

The photodiodes PD are provided so as to cover the lower electrodes 23 and the organic insulating film 94. Although not illustrated in FIG. 7, the photodiode PD has a configuration in which, for example, an electron transport layer (first carrier transport layer), an active layer, and a hole transport layer (second carrier transport layer) are stacked between the lower electrode 23 and the upper electrode 24.

The electron transport layer is formed by coating using a material such as zinc acetate, ethoxylated polyethylenimine (PEIE), or polyethylenimine (PEI).

A mixture of a p-type organic semiconductor and an n-type organic semiconductor is used as the active layer. poly((2,5-bis(2-hexyldecyl)-2,3,5,6-tetrahydro-3,6-dioxopyrrolo(3,4-c)pyrrole-1,4-diyl)-alt-(3',3"-dimethyl-2,2': 5',2"-terthiophene)-5,5"-diyl) (PMDPP3T) is an example of the p-type organic semiconductor. [6,6]-phenyl C61-butyric acid methyl ester (PC61BM) is an example of the n-type organic semiconductor. Alternatively, the active layer may be formed using a material such as P3HT:PC61BM or PTB7:PC71BM.

The hole transport layer is, for example, a metal oxide layer of, for example, tungsten oxide ($WO_3$) or a molybdenum oxide (MoOx). The hole transport layer is formed of a vapor-deposited film or a sputtered film. Alternatively, the hole transport layer may be formed by coating using a material such as PEDOT:PSS.

The electron transport layer, the active layer, and the hole transport layer forming the photodiodes PD are continuously provided so as to cover the lower electrodes 23. In other words, the photodiode PD includes a portion overlapping the lower electrode 23 and a portion provided above the organic insulating film 94 in an area not overlapping the lower electrode 23.

The upper electrode 24 is provided across above the photodiodes PD. The upper electrode 24 is an anode electrode of the photodiodes PD, and is continuously formed over the detection elements PAA (photodiodes PD). The upper electrode 24 is formed of, for example, a light-transmitting conductive material such as indium tin oxide (ITO) or indium zinc oxide (IZO).

As described above, the detection device 1 of the present embodiment includes the substrate 21, the photodiodes PD that are provided on the substrate 21 and include the organic semiconductors, the first switching elements Tr (transistors) that are provided correspondingly to the respective photodiodes PD and each include the semiconductor layer 61, the gate electrodes 64, and the source electrode 62, the lower electrodes 23 that are provided between the transistors and the photodiodes PD in the direction orthogonal to the substrate 21 and are provided correspondingly to the respective photodiodes PD, the upper electrode 24 provided across the photodiodes PD, the first auxiliary capacitor electrode 25 provided between the substrate 21 and the photodiode PD in the direction orthogonal to the substrate 21, and the second auxiliary capacitor electrode (for example, the second auxiliary capacitor electrode 61t in the same layer as that of the semiconductor layer 61) that is provided in the same layer as that of the semiconductor layer 61 or the source electrode 62 and faces the first auxiliary capacitor electrode 25 with the insulating film interposed therebetween.

The detection device 1 of the present embodiment further includes the third auxiliary capacitor electrode 62t. The second auxiliary capacitor electrode 61t is provided in the same layer as that of the semiconductor layer 61 so as to be continuous with the semiconductor layer 61. The third auxiliary capacitor electrode 62t is provided in the same layer as that of the source electrode 62 so as to be continuous with the source electrode 62. The first auxiliary capacitor electrode 25 is provided so as to overlap the second auxiliary capacitor electrode 61t and the third auxiliary capacitor electrode 62t in the plan view.

With this configuration, in the detection device 1, the auxiliary capacitor Cs generated between the first auxiliary capacitor electrode 25 and the third auxiliary capacitor electrode 62t with the interlayer insulating film 93 interposed therebetween, and between the first auxiliary capacitor electrode 25 and the second auxiliary capacitor electrode 61t facing one another with the gate insulating film 92 interposed therebetween is added to the capacitive element Ca generated between the lower electrode 23 and the upper electrode 24 of the photodiode PD. Thus, the maximum electric charge amount stored in the capacitive element Ca and the auxiliary capacitor Cs can be increased when the photodiode PD is irradiated with light. As a result, even when the dark current flows into the photodiode PD, the electric charge amount of the capacitive element Ca and the auxiliary capacitor Cs is larger than in the configuration including only the capacitive element Ca after the lapse of the predetermined time. Thus, the maximum value of the output signal $V_{out}$ from the photodiode PD increases. Therefore, the detection device 1 can improve the detection sensitivity.

First Modification

Figure 9:
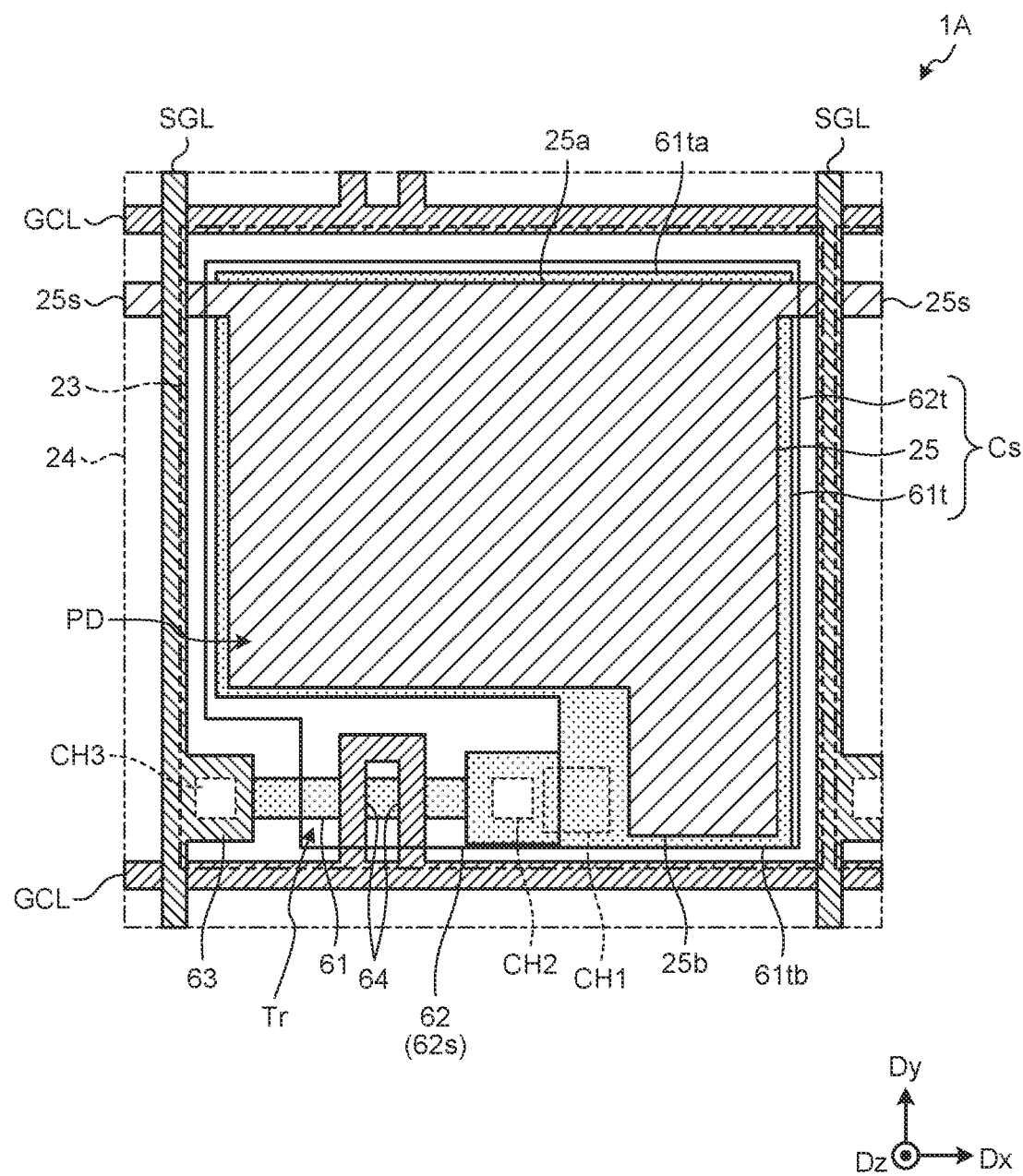
FIG. 9 is a plan view schematically illustrating a detection device according to a first modification.

FIG. 9 is a plan view schematically illustrating a detection device according to a first modification. In the following description, the same components as those described in the embodiment above are denoted by the same reference numerals, and the description thereof will not be repeated.

As illustrated in FIG. 9, in a detection device 1A according to the first modification, the position of the coupling portion 25s to couple together the first auxiliary capacitor electrodes 25 differs from that of the embodiment described above. As illustrated in FIG. 9, in the detection device 1A according to the first modification, the coupling portion 25s is coupled to an outer edge in the second direction Dy of the first portion 25a of the first auxiliary capacitor electrode 25. More specifically, the coupling portion 25s is coupled to one of the outer edges in the second direction Dy of the first portion 25a, and the second portion 25b is coupled to the other of the outer edges in the second direction Dy of the first portion 25a.

The position of the coupling portion 25s can be changed to any position that overlaps neither the gate line GCL nor the gate electrodes 64.

In the first modification, the lower electrode 23 is formed to have a larger area in the plan view than in the embodiment described above. The lower electrode 23 is provided so as to overlap the gate lines GCL and the signal lines SGL in the plan view. The lower electrode 23 may be provided so as to overlap at least either of the gate lines GCL and the signal lines SGL. Increasing the area of the lower electrode 23 increases the capacitance value of the capacitive element Ca generated between the anode and cathode of the photodiode PD. As a result, the maximum electric charge amount stored in the capacitive element Ca and the auxiliary capacitor Cs can be increased.

Second Modification

Figure 10:
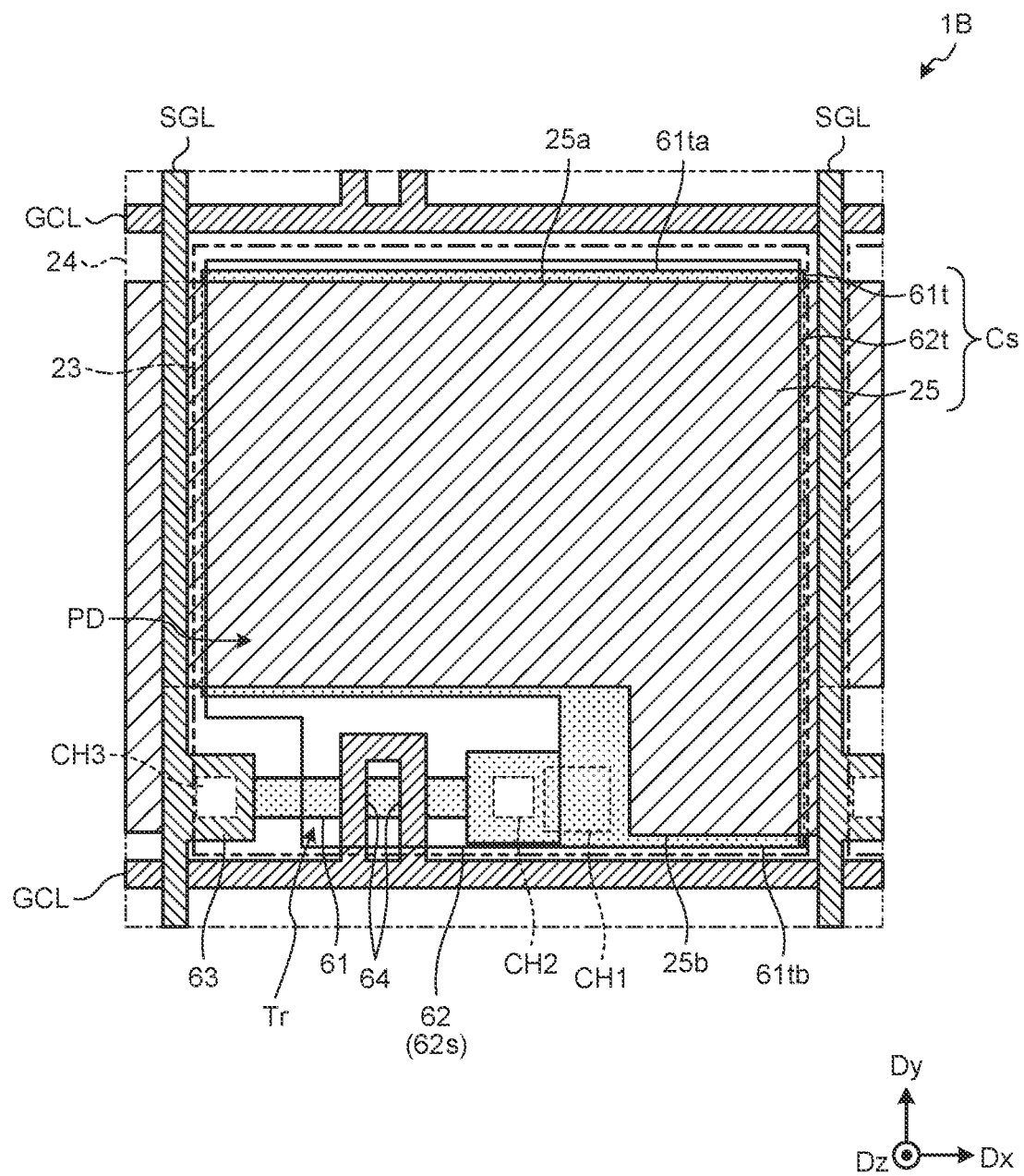
FIG. 10 is a plan view schematically illustrating a detection device according to a second modification.

FIG. 10 is a plan view schematically illustrating a detection device according to a second modification. As illustrated in FIG. 10, in a detection device 1B according to the second modification, the area of the first auxiliary capacitor electrode 25 in the plan view is larger than that in the embodiment and the modification described above. That is, the first auxiliary capacitor electrode 25 in the same layer as that of the gate line GCL is provided so as to overlap the signal lines SGL, and is provided so as to be separate from the gate lines GCL. More specifically, the first portion 25a of the first auxiliary capacitor electrode 25 extends in the first direction Dx over the detection elements PAA, and is provided so as to overlap the signal lines SGL. In other words, the coupling portion 25s (refer to FIG. 7) is formed to have the same width as that of the first portion 25a. This configuration can increase the capacitance of the auxiliary capacitor Cs in the second modification.

Third Modification

Figure 11:
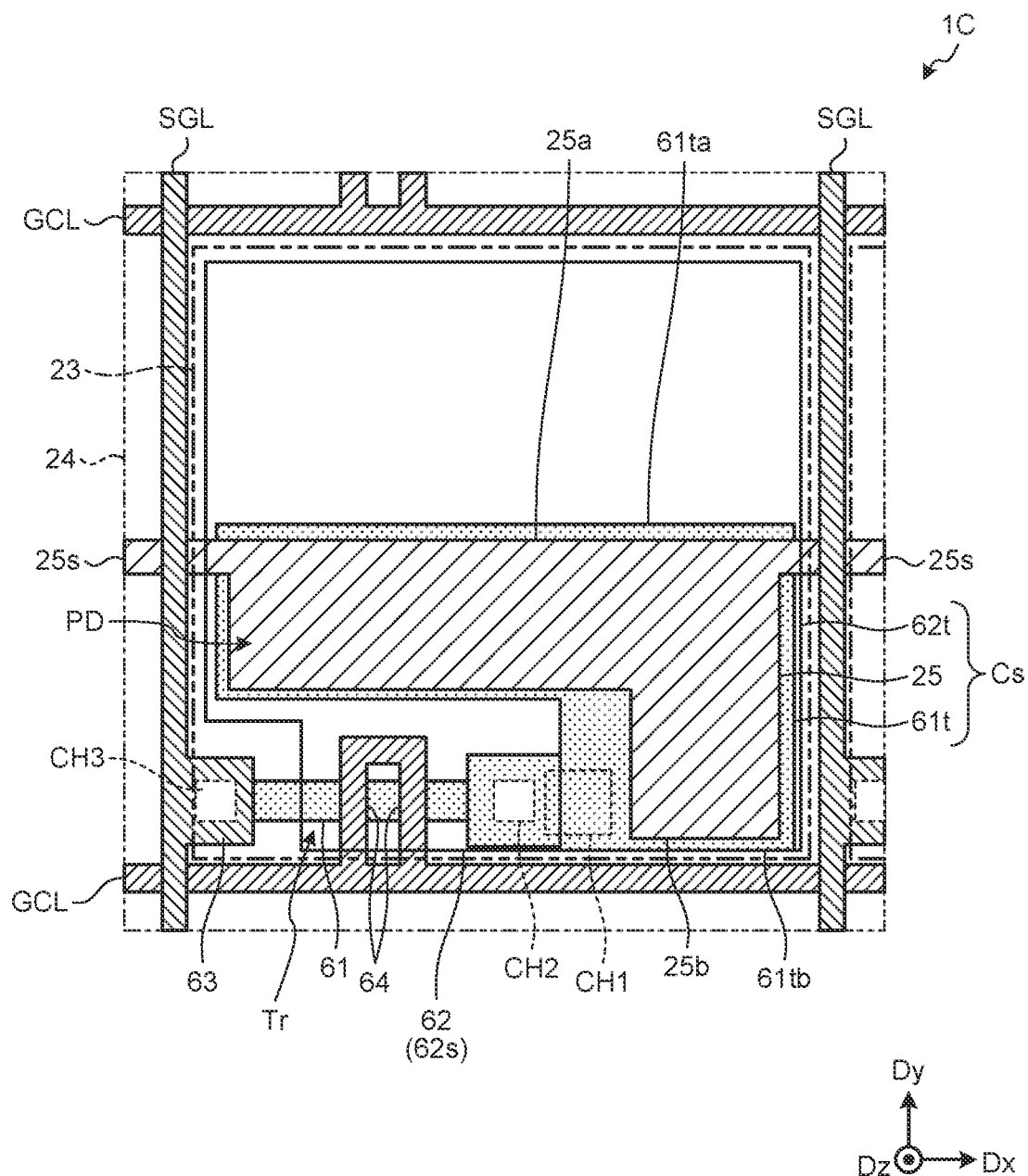
FIG. 11 is a plan view schematically illustrating a detection device according to a third modification.

FIG. 11 is a plan view schematically illustrating a detection device according to a third modification. As illustrated in FIG. 11, in a detection device 1C according to the third modification, the areas of the first auxiliary capacitor electrode 25 and the second auxiliary capacitor electrode 61t in the plan view are smaller than those in the embodiment and the first and the second modifications described above. More specifically, the first auxiliary capacitor electrode 25 and the second auxiliary capacitor electrode 61t are provided in an approximately half area on the first switching element Tr side of the area defined by the gate lines GCL and the signal lines SGL. The first portion 25a of the first auxiliary capacitor electrode 25 and the first portion 61ta of the second auxiliary capacitor electrode 61t have each a width in the second direction Dy smaller than half that in the embodiment (FIG. 7) described above.

Fourth Modification

Figure 12:
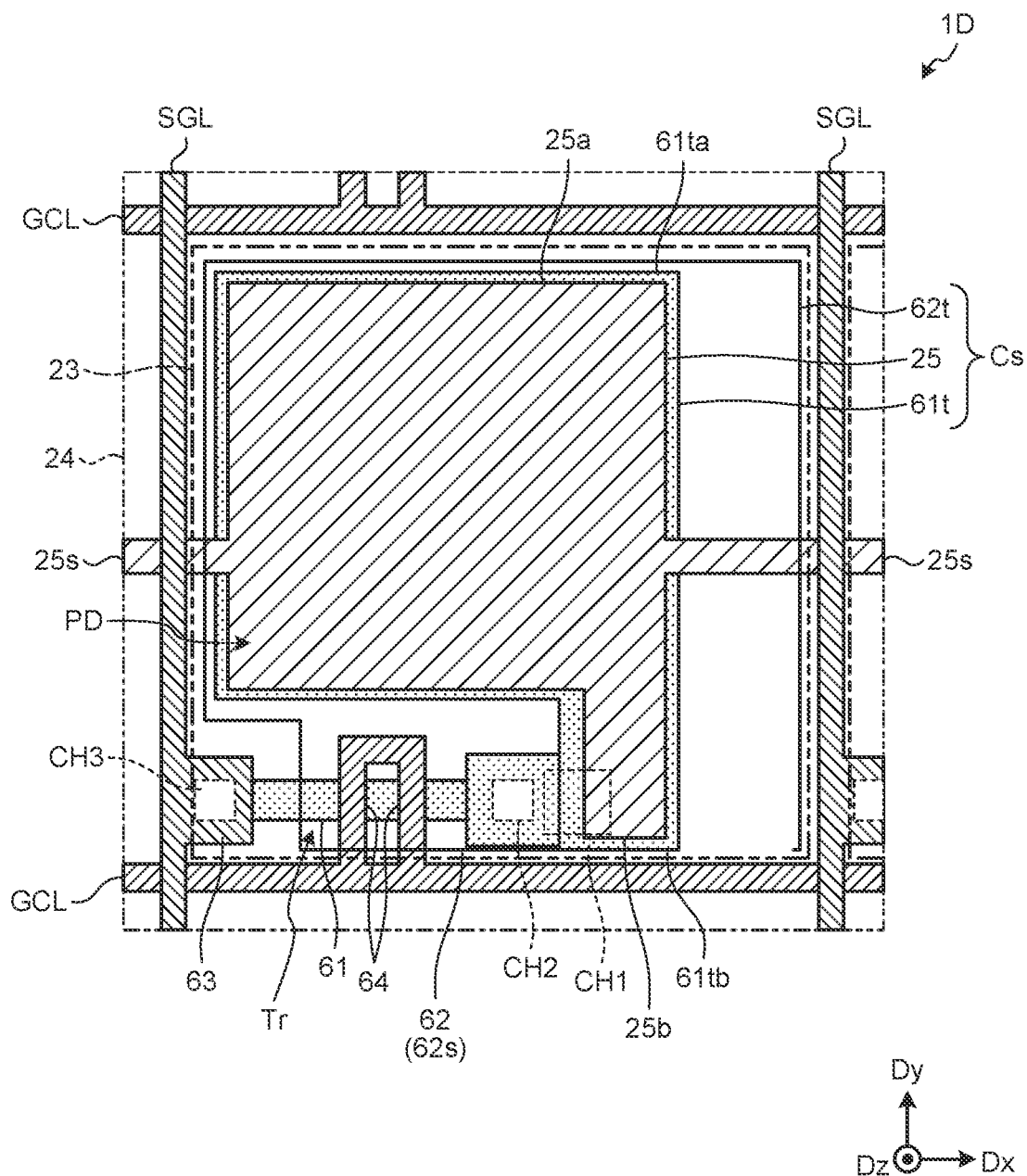
FIG. 12 is a plan view schematically illustrating a detection device according to a fourth modification.

FIG. 12 is a plan view schematically illustrating a detection device according to a fourth modification. As illustrated in FIG. 12, in a detection device 1D according to the fourth modification, the areas of the first auxiliary capacitor electrode 25 and the second auxiliary capacitor electrode 61t in the plan view are smaller than those in the embodiment and the first and the second modifications described above. Specifically, the first auxiliary capacitor electrode 25 and the second auxiliary capacitor electrode 61t have each a smaller width in the first direction Dx than that in the embodiment (FIG. 7) described above. That is, the first auxiliary capacitor electrode 25 and the second auxiliary capacitor electrode 61t are each formed to have a larger distance in the first direction Dx to the signal line SGL.

As illustrated in the detection device 1C of the third modification and the detection device 1D of the fourth modification, the shape, the area, the size, and the like of each of the auxiliary capacitor electrodes can be changed according to the required characteristics (capacitance value and time constant).

In each of the embodiment and the modifications thereof described above, the example of the photodiode PD has been described in which the lower electrode 23 serves as the cathode electrode of the photodiode PD and the upper electrode 24 serves as the anode electrode of the photodiode PD. However, the photodiode PD is not limited to this example. The lower electrode 23 may serve as the anode electrode of the photodiode PD, and the upper electrode 24 may serve as the cathode electrode of the photodiode PD.

In each of the embodiment and the modifications thereof described above, the configuration including the three layers of the auxiliary capacitor electrodes has been described. However, the configuration is not limited thereto, and only needs to include at least two layers of the auxiliary capacitor electrodes. For example, the configuration may be provided with the first auxiliary capacitor electrode 25 and one of the second auxiliary capacitor electrode 61t and the third auxiliary capacitor electrode 62t.

In each of the embodiment and the modifications thereof described above, the first portion 25a and the second portion 25b of the first auxiliary capacitor electrode 25 have each a quadrilateral shape in the plan view. However, the shape is not limited thereto. The shapes of the first portion 25a and the second portion 25b can be changed as appropriate according to the arrangement of the first switching element Tr and various types of wiring. The first portion 25a and the second portion 25b may each have a polygonal shape or partially formed in a curved shape. In the same manner, the shapes in the plan view of the second auxiliary capacitor electrode 61t and the third auxiliary capacitor electrode 62t can be changed as appropriate.

While the preferred embodiment of the present disclosure has been described above, the present disclosure is not limited to the embodiment described above. The content disclosed in the embodiment is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiment and the modifications thereof described above.

What is claimed is:

1. A detection device comprising:
    a substrate;
    a plurality of photodiodes that are provided on the substrate, and include organic semiconductors;
    a plurality of transistors that are provided correspondingly to the respective photodiodes, and each include a semiconductor layer, a gate electrode, and a source electrode;
    a plurality of lower electrodes that are provided between the transistors and the photodiodes in a direction orthogonal to the substrate, and are provided correspondingly to the respective photodiodes;
    an upper electrode provided across the photodiodes;
    a first auxiliary capacitor electrode provided between the substrate and each of the photodiodes in the direction orthogonal to the substrate;
    a second auxiliary capacitor electrode that is provided in the same layer as that of the semiconductor layer or the source electrode, and faces the first auxiliary capacitor electrode with an insulating film interposed between the first auxiliary capacitor electrode and the second auxiliary capacitor electrode; and
    an undercoat film,
    wherein
    all of the semiconductor layer and the second auxiliary capacitor electrode are a same material, and
    all of the second auxiliary capacitor electrode is in direct contact with the undercoat film.

2. The detection device according to claim 1, further comprising a third auxiliary capacitor electrode, wherein
    the second auxiliary capacitor electrode is provided in the same layer as that of the semiconductor layer so as to be continuous with the semiconductor layer,
    the third auxiliary capacitor electrode is provided in the same layer as that of the source electrode so as to be continuous with the source electrode, and
    the first auxiliary capacitor electrode is provided so as to overlap the second auxiliary capacitor electrode and the third auxiliary capacitor electrode in a plan view.

3. The detection device according to claim 1, further comprising:
    a plurality of gate lines that extend in a first direction; and
    a plurality of signal lines that extend in a second direction intersecting the first direction, wherein
    the first auxiliary capacitor electrode is provided in the same layer as that of the gate lines so as to be separate from the gate lines.

4. The detection device according to claim 3, wherein the first auxiliary capacitor electrode in the same layer as that of the gate lines is provided so as to overlap the signal lines, and is provided so as to be separate from the gate lines.

5. The detection device according to claim 4, wherein a distance from the first auxiliary capacitor electrode in the same layer as that of each of the gate lines to the gate line is equal to or smaller than a width of the gate line.

6. The detection device according to claim 1, comprising:
    a plurality of gate lines that extend in a first direction; and
    a plurality of signal lines that extend in a second direction intersecting the first direction, wherein
    the lower electrodes are provided so as to overlap at least either of the gate lines and the signal lines.

7. The detection device according to claim 1, further comprising a plurality of gate lines that extend in a first direction, wherein a contact hole is disposed in one of the lower electrodes, and the contact hole is between the source electrode and the first auxiliary capacitor electrode in the first direction.

8. The detection device according to claim 1, further comprising a plurality of gate lines that extend in a first direction; and a plurality of signal lines that extend in a second direction intersecting the first direction, wherein the first auxiliary capacitor electrode and the semiconductor layer that includes a first portion of the second auxiliary capacitor electrode overlap more than half of an area surrounded by the gate lines adjacent in the second direction and the signal lines adjacent in the first direction.

9. A detection device comprising:

a substrate;

a plurality of photodiodes that are provided on the substrate, and include organic semiconductors;

a plurality of transistors that are provided correspondingly to the respective photodiodes, and each include a semiconductor layer, a gate electrode, and a source electrode;

a plurality of lower electrodes that are provided between the transistors and the photodiodes in a direction orthogonal to the substrate, and are provided correspondingly to the respective photodiodes;

an upper electrode provided across the photodiodes;

a first auxiliary capacitor electrode provided between the substrate and each of the photodiodes in the direction orthogonal to the substrate;

a second auxiliary capacitor electrode that is provided in the same layer as that of the semiconductor layer or the source electrode, and faces the first auxiliary capacitor electrode with an insulating film interposed between the first auxiliary capacitor electrode and the second auxiliary capacitor electrode; and a plurality of gate lines that extend in a first direction, wherein a contact hole is disposed in one of the lower electrodes, and the contact hole is between the source electrode and the first auxiliary capacitor electrode in the first direction.

10. A detection device comprising:

a substrate;

a plurality of photodiodes that are provided on the substrate, and include organic semiconductors;

a plurality of transistors that are provided correspondingly to the respective photodiodes, and each include a semiconductor layer, a gate electrode, and a source electrode;

a plurality of lower electrodes that are provided between the transistors and the photodiodes in a direction orthogonal to the substrate, and are provided correspondingly to the respective photodiodes;

an upper electrode provided across the photodiodes;

a first auxiliary capacitor electrode provided between the substrate and each of the photodiodes in the direction orthogonal to the substrate;

a second auxiliary capacitor electrode that is provided in the same layer as that of the semiconductor layer or the source electrode, and faces the first auxiliary capacitor electrode with an insulating film interposed between the first auxiliary capacitor electrode and the second auxiliary capacitor electrode;

a plurality of gate lines that extend in a first direction; and a plurality of signal lines that extend in a second direction intersecting the first direction, wherein the first auxiliary capacitor electrode and the semiconductor layer that includes a first portion of the second auxiliary capacitor electrode overlap more than half of an area surrounded by the gate lines adjacent in the second direction and the signal lines adjacent in the first direction.

11. The detection device according to claim 9, further comprising a third auxiliary capacitor electrode, wherein the second auxiliary capacitor electrode is provided in the same layer as that of the semiconductor layer so as to be continuous with the semiconductor layer, the third auxiliary capacitor electrode is provided in the same layer as that of the source electrode so as to be continuous with the source electrode, and the first auxiliary capacitor electrode is provided so as to overlap the second auxiliary capacitor electrode and the third auxiliary capacitor electrode in a plan view.

12. The detection device according to claim 9, further comprising a plurality of signal lines that extend in a second direction intersecting the first direction, wherein the first auxiliary capacitor electrode is provided in the same layer as that of the gate lines so as to be separate from the gate lines.

13. The detection device according to claim 12, wherein the first auxiliary capacitor electrode in the same layer as that of the gate lines is provided so as to overlap the signal lines, and is provided so as to be separate from the gate lines.

14. The detection device according to claim 13, wherein a distance from the first auxiliary capacitor electrode in the same layer as that of each of the gate lines to the gate line is equal to or smaller than a width of the gate line.

15. The detection device according to claim 9, comprising a plurality of signal lines that extend in a second direction intersecting the first direction, wherein the lower electrodes are provided so as to overlap at least either of the gate lines and the signal lines.

16. The detection device according to claim 10, further comprising a third auxiliary capacitor electrode, wherein the second auxiliary capacitor electrode is provided in the same layer as that of the semiconductor layer so as to be continuous with the semiconductor layer, the third auxiliary capacitor electrode is provided in the same layer as that of the source electrode so as to be continuous with the source electrode, and the first auxiliary capacitor electrode is provided so as to overlap the second auxiliary capacitor electrode and the third auxiliary capacitor electrode in a plan view.

17. The detection device according to claim 10, wherein the first auxiliary capacitor electrode is provided in the same layer as that of the gate lines so as to be separate from the gate lines.

18. The detection device according to claim 17, wherein the first auxiliary capacitor electrode in the same layer as that of the gate lines is provided so as to overlap the signal lines, and is provided so as to be separate from the gate lines.

19. The detection device according to claim 18, wherein a distance from the first auxiliary capacitor electrode in the same layer as that of each of the gate lines to the gate line is equal to or smaller than a width of the gate line.

20. The detection device according to claim 10, wherein the lower electrodes are provided so as to overlap at least either of the gate lines and the signal lines.

* * * * *